United States Patent
Dirmeier et al.

(10) Patent No.: US 8,205,737 B2
(45) Date of Patent: Jun. 26, 2012

(54) APPARATUS FOR BUFFERING OBJECTS

(75) Inventors: Emil Dirmeier, Wolkering (DE);
Martin Seger, Neumarkt (DE)

(73) Assignee: Krones AG, Neutraubling (DE)

( * ) Notice: Subject to any disclaimer, the term of this patent is extended or adjusted under 35 U.S.C. 154(b) by 221 days.

(21) Appl. No.: 12/637,015

(22) Filed: Dec. 14, 2009

(65) Prior Publication Data
US 2010/0147652 A1 Jun. 17, 2010

(51) Int. Cl.
*B65G 47/52* (2006.01)
*B65G 15/12* (2006.01)

(52) U.S. Cl. .............. 198/347.1; 198/594; 198/598; 198/812

(58) Field of Classification Search .............. 198/594, 198/364, 347.1–347.4, 597, 598, 812
See application file for complete search history.

(56) References Cited

U.S. PATENT DOCUMENTS

| | | | | |
|---|---|---|---|---|
| 4,413,724 A | * | 11/1983 | Fellner | 198/594 |
| 4,513,858 A | | 4/1985 | Fellner et al. | |
| 6,026,947 A | * | 2/2000 | Persson | 198/364 |
| 6,152,291 A | * | 11/2000 | Steeber et al. | 198/594 |
| 6,152,812 A | | 11/2000 | Sung et al. | |
| 6,182,812 B1 | | 2/2001 | Hartness, III et al. | |
| 6,612,420 B1 | * | 9/2003 | Hartness et al. | 198/597 |
| 7,028,830 B2 | | 4/2006 | Beesley et al. | |
| 2008/0257685 A1 | | 10/2008 | Huttner et al. | |

FOREIGN PATENT DOCUMENTS

| | | |
|---|---|---|
| CA | 2364216 A1 | 6/2003 |
| EP | 1726544 A1 | 11/2006 |
| WO | WO-2005118439 A1 | 12/2005 |
| WO | WO-2006040058 A1 | 4/2006 |

OTHER PUBLICATIONS

German Search Report for 10 2008 014 831.8 dated Sep. 2, 2010.

* cited by examiner

*Primary Examiner* — Mark A Deuble
(74) *Attorney, Agent, or Firm* — Marshall, Gerstein & Borun LLP (57) ABSTRACT

An apparatus for buffering objects having at least one first conveyor and at least one second conveyor, where objects enter the apparatus via the first conveyor and leave the apparatus via the second conveyor. Along a linear guide, a transfer device can be moved parallel to first and second conveyor to transfer objects from the first conveyor to the second conveyor. A control means unfolds and/or retracts a rail extending on at least one side of the first and/or second conveyor, dependent on the position of the transfer device.

20 Claims, 12 Drawing Sheets

APPARATUS FOR BUFFERING OBJECTS

FIELD OF THE DISCLOSURE

The present disclosure relates to an apparatus for buffering objects, and more particularly, to an apparatus for buffering objects which comprises at least one first conveyor and one second conveyor which are parallel to each other, but driven in opposite directions.

BACKGROUND

International patent application WO 2006/040058 A1 also discloses an apparatus for buffering objects. The device comprises two parallel conveyors that can be driven in opposite directions. In the same way, a linear guide is provided which moves a transfer device in parallel to the transfer direction of the conveyors. By means of the transfer device, objects are transferred from one conveyor to the other. One drawback of said device is the lack of security during displacement of transfer device to prevent objects from falling down from the first respectively the second conveyor.

International patent application WO 2005/118439 A1 a so discloses a device for diverting articles. In this application, too, two conveyors that are arranged in parallel but driven in opposite directions are provided. By means of a diverter element, infed articles are diverted to the outfeed conveyor. Along with the displaceable diverter element, a limited barrier may also be displaced which is associated to the conveyor belt which moves the converter element along the first respectively the second conveyor. Said device does not prevent either incoming or outgoing objects from falling down from the conveyor belt.

European patent application EP 1726544 A1 also discloses an apparatus for buffering objects. In this application too, a barrier is associated with the driving unit for transfer device which thus is carried along the travel path of transfer device. This device may neither prevent objects from falling down from infeed nor outfeed conveyor.

SUMMARY OF THE DISCLOSURE

It is the object of the present disclosure to provide an apparatus for buffering objects ensuring that no objects may fall down from infeed nor outfeed conveyor, regardless of position of transfer device. Moreover, the present disclosure shall guarantee a trouble-free function of an apparatus for buffering objects.

with the present disclosure provides an apparatus for buffering objects comprising at least one first conveyer and one second conveyor which are parallel to each other, but driven in opposite directions. Via the first conveyor objects enter the device, and via the second conveyor objects leave the apparatus for buffering objects again. Along a linear guide, a transfer device can be moved parallel to the at least first and second conveyor to transfer objects from the first conveyor to the second conveyor.

A particular advantage of the disclosure is to provide a controller unfolding and/or retracting a rail extending on at least one side of the first and/or second conveyor, in accordance with position of transfer device.

The controller may be realized in the form of an electronical controller determining a travel path of the transfer device along the linear guide and thus controlling position of the rail in a motor-driven and/or pneumatic way.

Another possibility to control position of the rail is to use a curved element as controller. This curved piece respectively curved element may be displaced, together with the transfer device, along the linear guide and induces an adjustment of the rail in accordance with the position of the transfer device along the first respectively the second conveyor.

It is particularly convenient if the rail is composed of a plurality of individually movable segments which may be individually controlled correspondingly, depending on the position of the transfer device.

According to an embodiment of the disclosure, the rail may be provided on a corresponding outside of first and second conveyor. In the same way, a rail may be provided between first and second conveyor.

In another embodiment of the disclosure, the transfer device is furthermore equipped with a diverter element. The diverter element has a determined width so that first and second conveyor are spaced by this width of diverter element. In this embodiment, a rail is provided on each inner side of first and second conveyor.

It is particularly convenient if the rail is composed of a plurality of individual segments. The individual rail segments have a substantially cuboid-shaped end portion one exterior surface of which is shaped in a way that the different elements form a substantially continuous surface with each other.

In its unfolded versus retracted state the rail rises above a surface defined by first and second conveyor. In the rail's retracted state, exterior surface of the different cuboid-shaped end portions of the rail segments substantially flushes with the surface defined by first and second conveyor.

In a second embodiment of the disclosure, the surface defined by first and second conveyor may also be lowered by the rail in its unfolded state. This embodiment of lowering the rail onto the surface defined by first and second conveyor is especially useful for that rail which is assigned for being arranged between first and second conveyor.

The rail may be pretensioned by means of a flexible element. The flexible element ensures transition of the rail respectively the different rail segments into its unfolded state. In a preferred embodiment, the flexible element is shaped as a spring.

Transfer device is equipped with at least one curved element which ensures transition of the rail respectively the different rail segments from unfolded into retracted state. The curved element itself consists of a rectangular portion with a determined height. Both ends of rectangular portion of the curved element are provided with a cam each. Said curve respectively the whole curved element cooperates with a rotatable element of the rail respectively a rail segment. This cooperation causes a change of position of cuboid-shaped end portion of the rail respectively of the rail segment arranged opposite to the rotatable element.

BRIEF DESCRIPTION OF THE DRAWINGS

In the following, embodiments of the apparatus for buffering objects according to the disclosure and its advantages are explained in greater detail.

FIG. 2 shows a cutout of a side-face view of the apparatus for buffering objects which shows the part of the apparatus which the transfer device for the objects is being positioned in.

DETAILED DESCRIPTION OF THE PREFERRED EMBODIMENT

Identical or similar elements of the disclosure are referred to with identical references. Moreover, for clarity reasons, only those references have been represented in the different figures which are essential for description of the corresponding figure.

Figure 1:
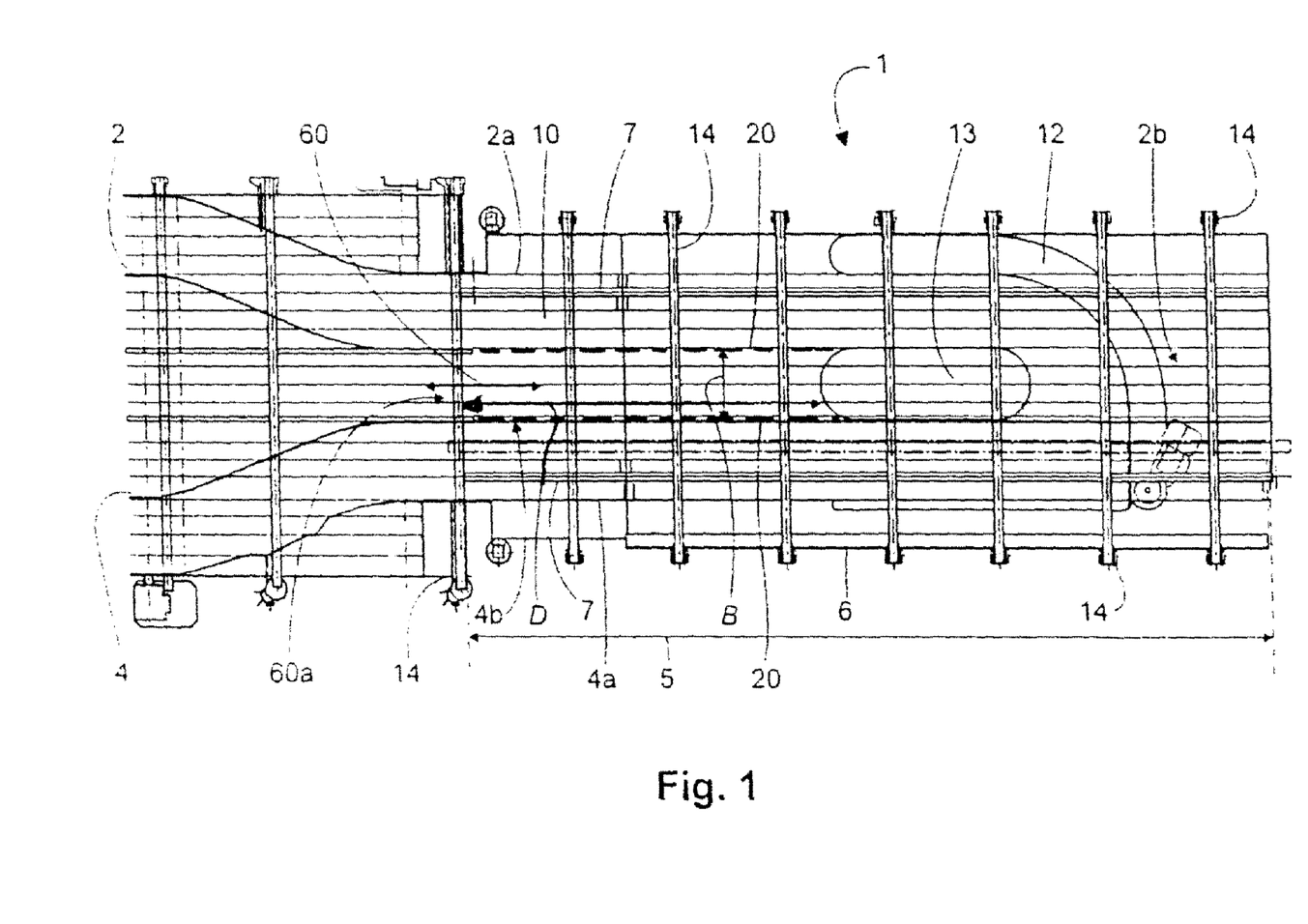
FIG. 1 is a top view of an apparatus for buffering objects.

Top view on the apparatus 1 for buffering objects is shown in FIG. 1. The form of the apparatus 1 for buffering objects is essentially like a table and the apparatus has a continuous surface 10. Surface 10 of the apparatus 1 for buffering objects is essentially defined by at least one first conveyor 2 and at least one second conveyor 4. In the stacking area 5 of the apparatus 1 for buffering objects, the at least one first conveyor 2 and the at least one second conveyor 4 extend essentially parallel to each other. First conveyor 2 and second conveyor 4 are, however, driven in opposite directions. Objects enter the apparatus 1 for buffering objects via the first conveyor 2. Via the second conveyor 4, objects leave the apparatus 1 for buffering objects. A linear guide 7 allocated to apparatus 1 allows linear movement of a transfer device 12 on the surface 10 of apparatus 1. By means of the transfer device 12, objects in apparatus 1 may be transferred from first conveyor 2 to second conveyor 4. Linear displacement of transfer device 12 is necessary lithe quantity of objects entering the apparatus 1 via the first conveyor 2 exceed quantity of objects leaving the apparatus 1 via the second conveyor 2. In the same way, a buffering of the objects by means of the apparatus 1 may become necessary in case of malfunctions of (non represented) processing devices downstream of the second conveyor 4. Thus, it must be guaranteed that the devices provided upstream to first conveyor 2 may continue working without the whole plant being able to be operated again before those appliances provided downstream of the second conveyor 4 are in function again. In the embodiment of the apparatus 1 depicted here, transfer device 12 is equipped with a diverter element 13. The diverter element 13 has a width B so that first conveyor 2 and second conveyor 4 are spaced apart by the width B. By means of a plurality of rollers 14 provided in the form of continuous belts, the at least first conveyor 2 and the at least second conveyor 4 are displaced. According to another embodiment of the disclosure, the diverter element 13 may be dropped so that the space between first conveyor 2 and second conveyor 4 will only be a small one any more. Inner surface 2b of first conveyor 2 and inner surface 4b of second conveyor 4 are then oriented directly in front of each other respectively are only slightly spaced apart from each other.

FIG. 1 shows another embodiment of the apparatus 1 for buffering objects. Apparatus 1 comprises a telescopic array 60 controlled by a controller in a way that according to the distance D between diverter element 13 and an area 60a of the apparatus 1, from which first and second conveyor 2 and 4 extend parallel to each other, telescopic array 60 unfolds a rail 20 in the corresponding distance. Rail 20 thus guarantees that no objects may penetrate into the space occupied by the diverter element 13 between first and second conveyor 2 and 4.

Figure 2:
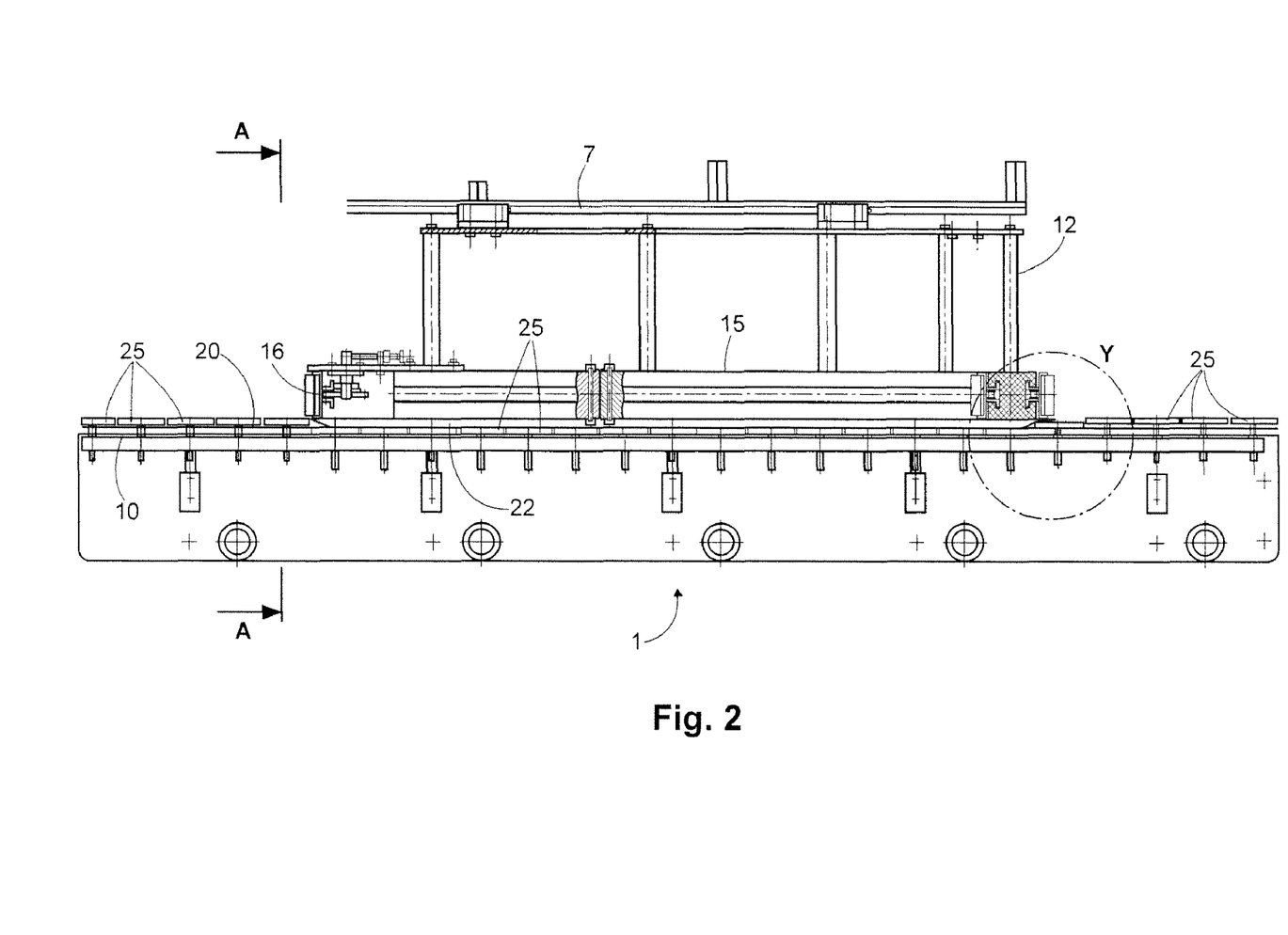

FIG. 2 is a side-face view of the apparatus 1 for buffering objects showing, however, only a cutaway view of the apparatus 1. The cutaway view of apparatus 1 comprises in this case the transfer unit 12 which is displaceable along linear guide 7, as already mentioned in the description of FIG. 1. Transfer device 12 has a bow-shaped guide 15 which allows transfer of objects from first conveyor 2 to second conveyor 4. On one side, transfer device 12 has a guiding body 16 which allows guiding of objects accordingly. Objects entering via the first conveyor 2 are thus securely transferred, with the help of the guiding body 16, to the second conveyor 4. In the side-face view of the device 1 depicted here, transfer device 12 is connected to a controller 22. In the embodiment depicted here, controller 22 is provided in the form of a curve. Controller 22 is dedicated for bringing the rail 20 into a retracted respectively folded position. For instance, rail 20 may be provided at the outside 2a of first conveyor 2 and/or along the outside 4a of second conveyor 4. FIG. 2 shows the rail with multiple segments 25 extending along the outside 2a of the first conveyor 2, the outside of the second conveyor 4 or between the first conveyor 2 and the second conveyor 4. In the area in which controller 22 cooperates with different segments 25 of rail 20, segments 25 are pushed down. Curved element 22 thus makes it possible to control position of the rail 20 in accordance with position of the transfer device 12. In the same way, controller 22 may be provided as a (non-represented) electronical control. To that end, for instance, position of transfer device 12 may be determined by means of a displacement transducer known in the state of the art. Thus, depending on position of transfer device 12, the different segments 25 of the rail 20 may be controlled correspondingly. Control may for instance be power- and/or pneumatically operated.

Figure 3:
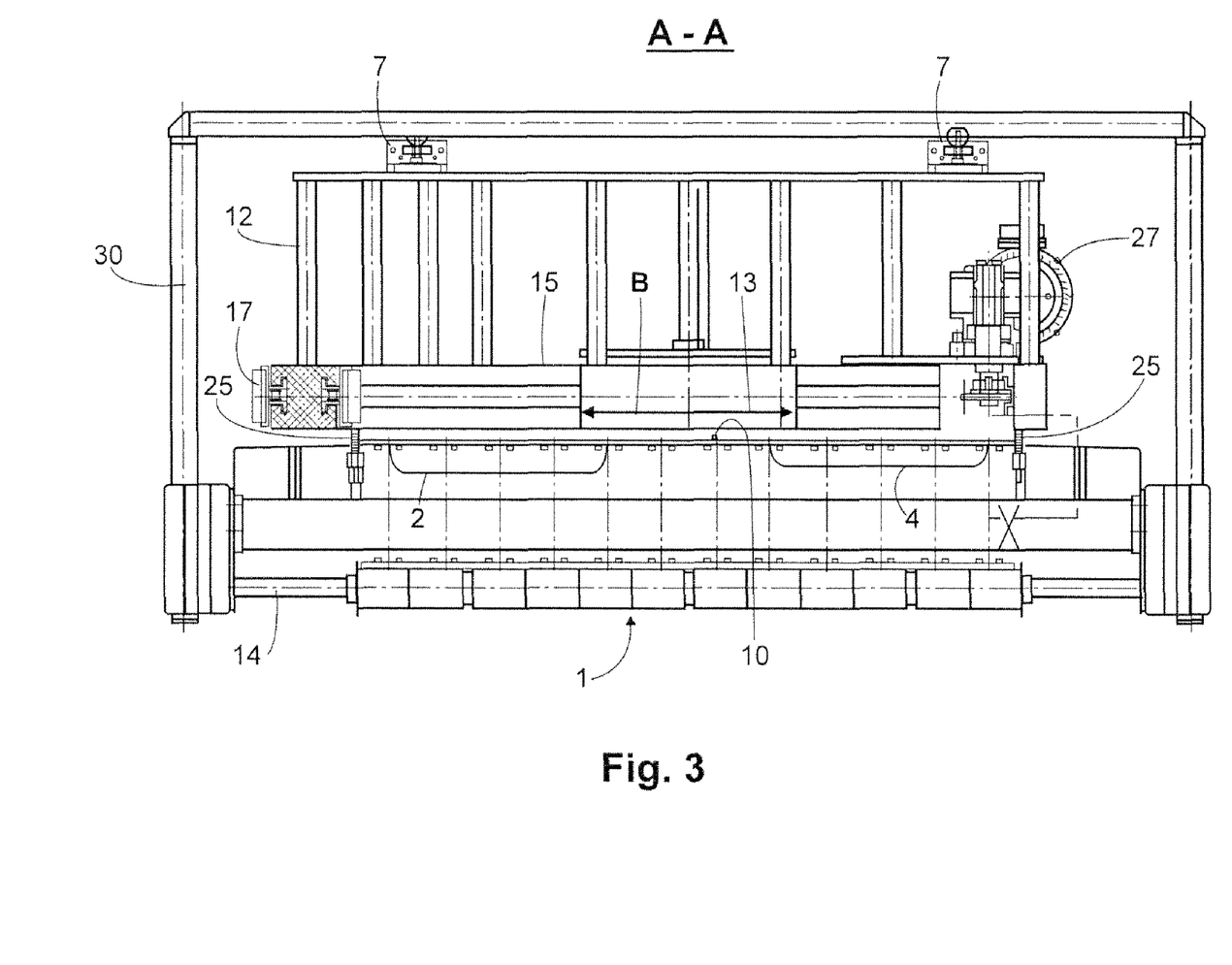
FIG. 3 is a view of the apparatus for buffering objects along intersection line A-A of FIG. 2.

FIG. 3 is a view of transfer device 12 arrangement with respect to first conveyor 2 versus second conveyor 4 from intersection line A-A of FIG. 2. In the arrangement represented here, transfer device 12 is guided with the help of a frame 30 and the linear guide 7 above the surface 10 of first conveyor 2 with respect to the second conveyor 4. In the representation of this drawing, transfer device 12 is equipped with a bow-shaped guide 15. Bow-shaped guide 15 extends from one exterior 2a of first conveyor 2 to one exterior 4a of second conveyor 4. Bow-shaped guide 15 is provided in the form of a drivable endless conveyor belt 17. Drivable endless conveyor belt 17 is driven by a motor 27 to transfer objects from first conveyor 2 to second conveyor 4. In the embodiment shown in FIG. 3, the diverter element of a width B is provided between first conveyor 2 and second conveyor 4.

First conveyor 2 and second conveyor 4 are thus spaced apart by this diverter element 13 and its width B. In the embodiment of FIG. 3, there are segments 25 for the rail 22 on both exteriors 2a, 4a of the first conveyor 2 and the second conveyor 4.

Figure 4:
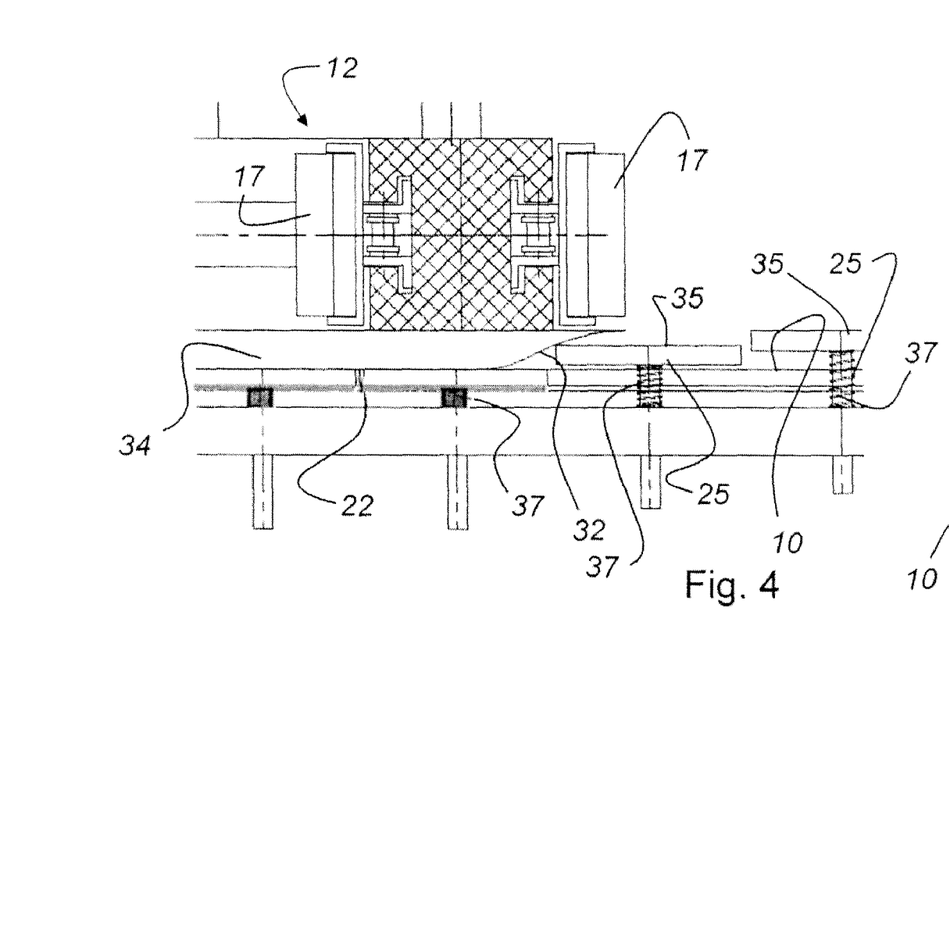
FIG. 4 is a detail view of the circle referred to as Y in FIG. 2.

FIG. 4 is a detail view of the circle referred to as Y in FIG. 2. Transfer device 12 houses controller 22. Controller 22 is provided in the form of a curved element. In this case, curved element comprises a rectangular portion 34 having a curve 32 on both ends. In the embodiment shown here, curve 32, depending on moving direction of transfer device 12, gets into contact with the surface respectively cuboid-shaped end portion 35 of the individual segment 25 of rail 22. Consequently, segment 22 is pressed down and held by rectangular portion 34 of controller 22 in its retracted position. In the retracted position, surface respectively exterior surface of cuboid-shaped end portion 35 flushes with the surface 10 of first conveyor 2 with respect to the second conveyor 4. To the individual segments 25 of rail 22, a flexible element or a spring 37 is attached each. This ensures that the individual segments 25 may return into their unfolded position when transfer device 12 respectively controller 22 associated with transfer device 12 is no more in a mechanical operational correlation with the individual segments 25 of rail 22.

Figure 5:
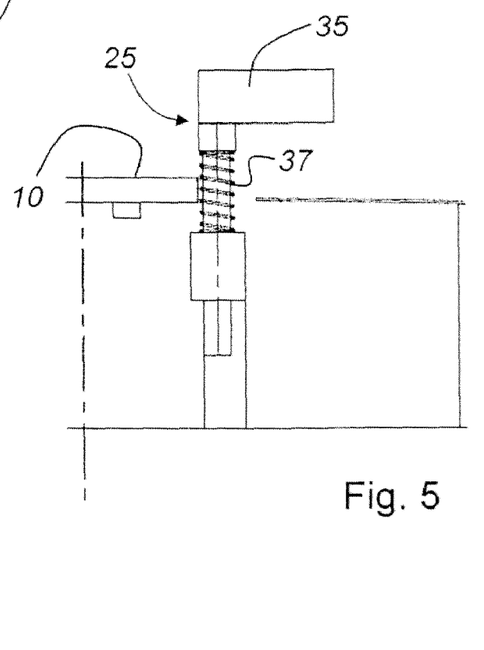
FIG. 5 is a detail view of the area referred to as X in FIG. 3.

FIG. 5 is a detail view of the area referred to as X in FIG. 3. FIG. 5 shows a segment 25 of rail 22 on an enlarged scale and in its unfolded position. On top, segment 25 bears cuboid-shaped end portion 35 which, in retracted state, flushes, as a matter of fact, with the surface 10 of the first conveyor 2 with respect to the second conveyor 4. In its state represented here, segment 25 is unfolded and cuboid-shaped end portion 35 rises above surface 10. Segment 25 is pretensioned by means of a flexible element which in this case is a spring 37.

Figure 6:
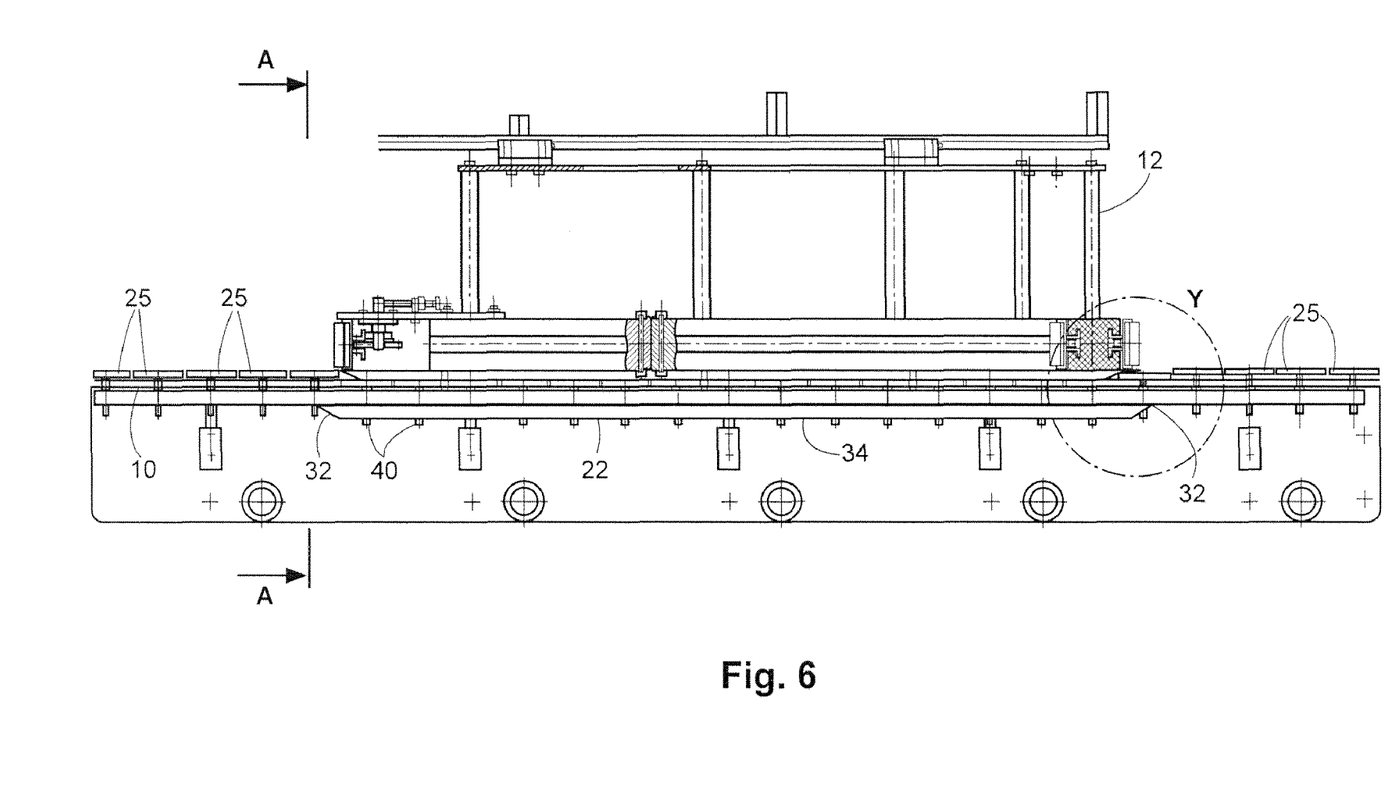
FIG. 6 shows another embodiment of the apparatus for buffering objects, the transfer device being equipped with a curved element which pulls down the different elements of the rail.

FIG. 6 shows another embodiment of controller 22 allowing the individual segments 25 of rail 22 to be moved in coordination with displacement of transfer device 12. In the embodiment represented here, controller 22 is fitted under the top surface 10 of first conveyor 2 and second conveyor 4. Controller 22 also consists of a rectangular body 34 having a curve 32 on both ends. In the embodiment represented here, controller 22 cooperates with a plurality of rotatable elements 40. Each segment 25 of rail 20 is provided with a rotatable element 40. Thus, in the embodiment of FIG. 6, the individual segments 25 are pulled down dependent on the position of transfer device 12. As controller 22 does no more cooperate with the rotatable element 40 of a segment 25, segment 25 is pulled back, with the help of the flexible element 37, into the unfolded position. Unfolded position always means that the surface of cuboid-shaped end portion 35 of segment 25 rises above the top surface 10 defined by first conveyor 2 and second conveyor 4.

Figure 7:
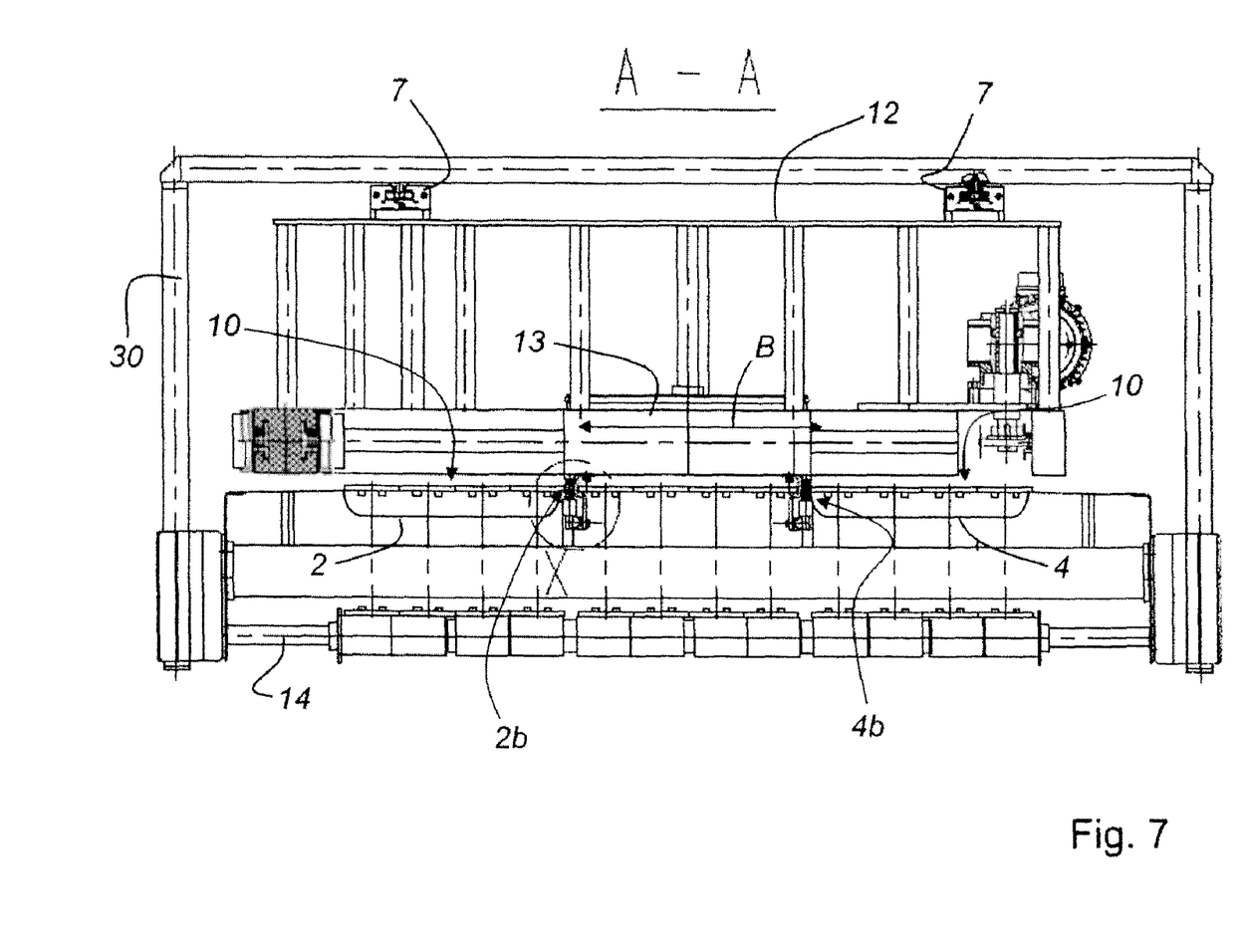
FIG. 7 is a view of the apparatus for buffering objects seen from intersection line A-A of FIG. 6.

FIG. 7 is a view of another embodiment of the disclosure seen from intersection line A-A of FIG. 6. In the embodiment represented here, first conveyor 2 and second conveyor 4 are spaced apart via diverter element 13 of transfer device 12. As the diverter element 13 has a limited extension in the moving direction of the conveyors 2, 4, it must be prevented here, too, that objects to be transferred may penetrate into the space B between first conveyor 2 and second conveyor 4. To this effect, on each inner surface 2b, 4b of first conveyor 2 and second conveyor 4 there is a rail 22 which is also composed of individual segments 25 position of which regarding the upper side 10 of first conveyor 2 and second conveyor 4 is controlled accordingly along linear guide 7, depending on the state of transfer device 12.

Figures 8, 9:
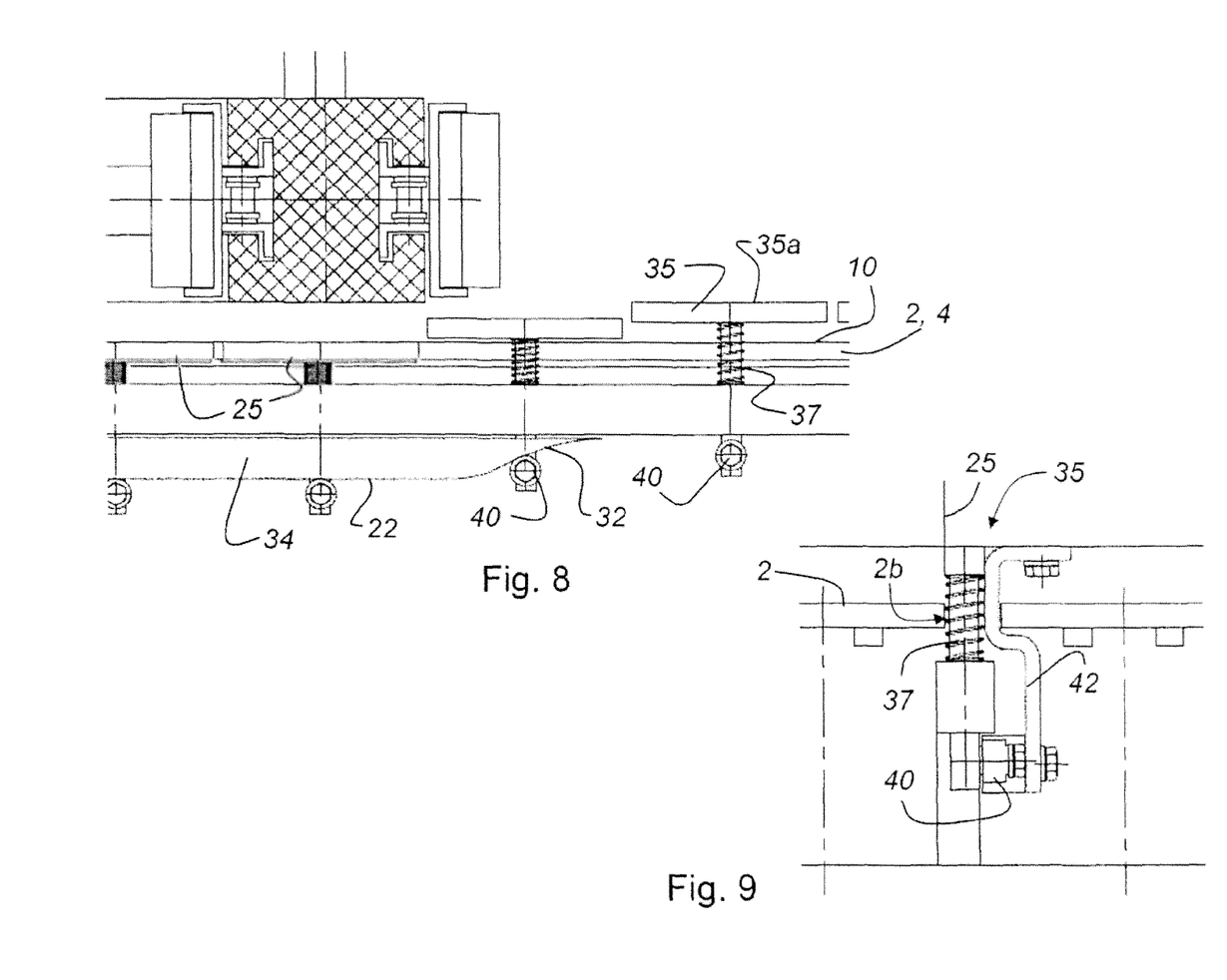
FIG. 8 is a detail view of the circle referred to as Y in FIG. 6.
FIG. 9 is a detail view of the area referred to as X in FIG. 7.

FIG. 8 is an enlarged detail view of the circle referred to as Y in FIG. 6. As already mentioned, controller 22 is fitted beneath the top surface 10 of first conveyor 2 resp. second conveyor 4. Controller 22 is carried along in correspondance with travel path of transfer device 12. Controller 22 has, als already depicted in FIG. 4, a rectangular portion 34 having a curve 32 each on both ends. In the embodiment of FIG. 8, curve 32 cooperates with a rotatable element 40 which is fitted to each segment 25 of the rail 20. Rotatable element 40 is provided as a movable bearing rolling down along controller 22. As soon as curve 32 of controller 22 comes in contact with rotatable element 40, the corresponding segment 25 of rail 22 gets into its retracted position. As soon as rotatable element 40 rolls down controller 22 in rectangular portion 34, all segments 25 are hold in a constant plain which essentially flushes with plain 10 respectively the surface defined by first conveyor 2 and second conveyor 4. As already mentioned several times, individual segments 25 are also tensioned by a flexible element 37. With the help of the flexible element 37, a restoring force may thus be produced which forces segment 25 back into unfolded position when segment 25 does no more cooperate with controller 22. FIG. 8 shows the right segment 25 in its unfolded state. End portion 35 of segment 25 rises above surface 10 defined by first and second conveyor 2, 4. It is an advantage if end portion 35 of segment 25 has a cuboid-shaped form. For a person skilled in the art, form of end portion 35 is not necessarily in any case a cuboid. It is just necessary that surface 35a of end portion 35 has a form such that in the lowered state of the individual segments 25 respectively of the rail 22, an essentially continuous surface is provided which is exempt from unevenness, steps and gaps.

FIG. 9 is an enlarged detail representation of the circle referred to as X in FIG. 7. On the inner surface 2b of first conveyor 2 respectively on the inner surface 4b of second conveyor 4 (non-represented here), there are rails 20, too, which are composed, as already repeatedly mentioned, of individual segments 25. These segments 25 are also controlled via a controller and transferred from an unfolded into a retracted position. Force transmission from rotatable element 40 to cuboid-shaped element 35 of segment 25 is realized with the help of a cranked element 42.

Figure 10:
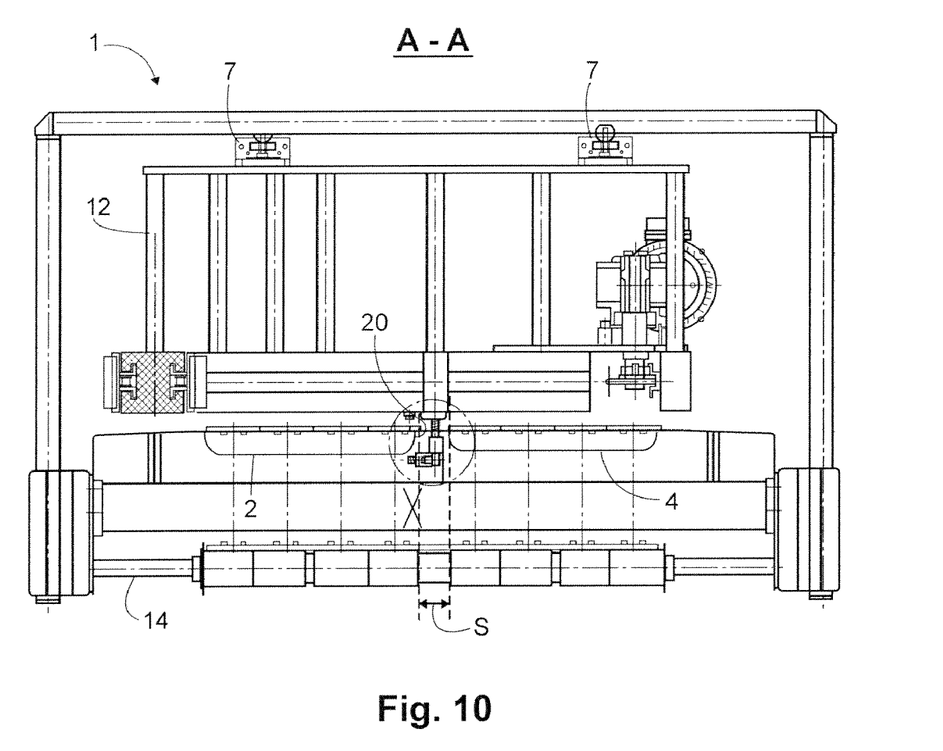
FIG. 10 shows another embodiment of the transfer device which allows insertion of a rail between first and second conveyor.

FIG. 10 shows another embodiment of apparatus 1 for buffering objects as well as the corresponding configuration of the space between first conveyor 2 and second conveyor 4. In this embodiment, there is no (livelier element between first conveyor 2 and second conveyor 4. Thus, both conveyors are only spaced from each other by a small gap S. This gap S may be used to guide a rail 20 in it. This rail 20 is, in this case too, divided into several segments 25 and can be accordingly controlled, according to its position along linear guide 7, dependent on the state of transfer device 12. Dependent on the state of the transfer device 12, rail 20 may then be unfolded respectively retracted, as already mentioned several times.

Figure 11:
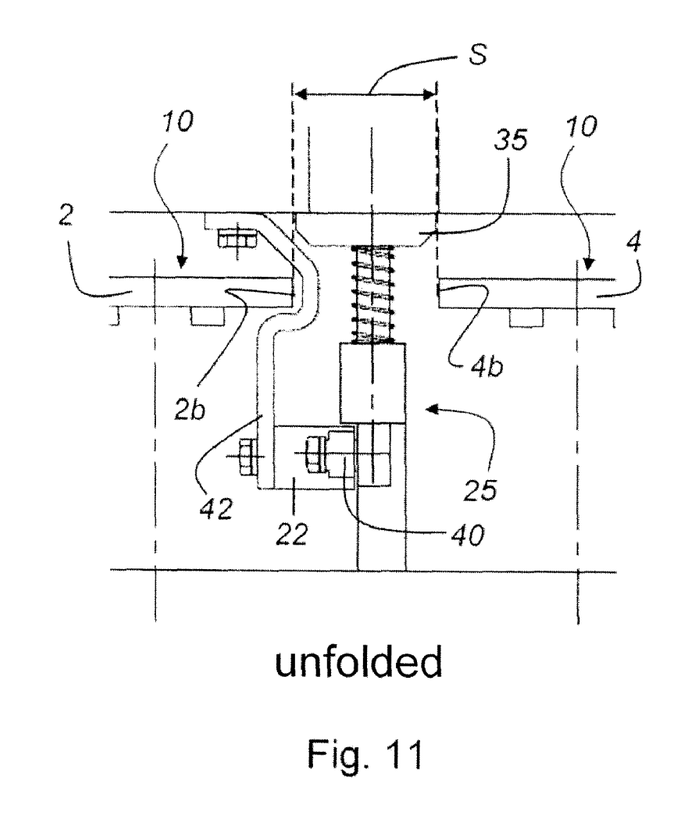
FIG. 11 shows the area referred to as X in FIG. 10, the rail being unfolded.
Figure 12:
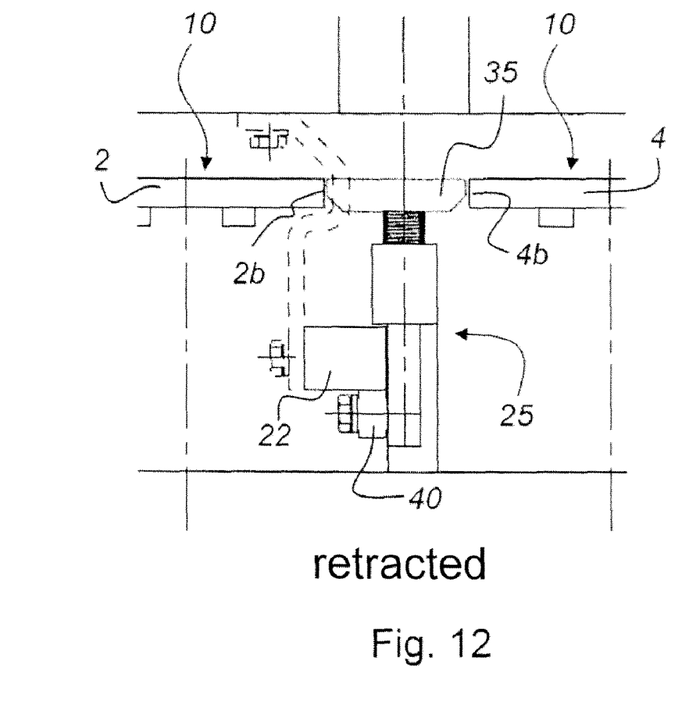
FIG. 12 shows the area referred to as X in FIG. 10, the rail being retracted.

FIGS. 11 and 12 show the area marked by circle X in FIG. 10 on an enlarged scale which the controller 22 for readjusting individual adjusting components 25 on a cranked element 42 is realized in. In the position represented in FIG. 11, segment 25 is in its unfolded state. Controller 22 does not yet cooperate with rotatable element 40 on the bottom of segment 25. By virtue of flexible element 37 respectively spring upper portion 35 of segment 25 is located above the level of the surface 10 defined by first conveyor 2 and second conveyor 4. FIG. 12 shows retracted state of adjusting component 25. Here, rectangular portion 34 of controller 22 does cooperate with rotatable element 40 of segment 25. Thus, upper portion 35 of segment 25 forms a flushed surface with surface 10 defined by first conveyor 2 and second conveyor 4 without any embossments nor edges in between. Upper portion 35 of segment 25 fits into gap S by which are spaced apart inner surface 2b of first conveyor 2 and inner surface 4b of second conveyor 4.

Figure 13:
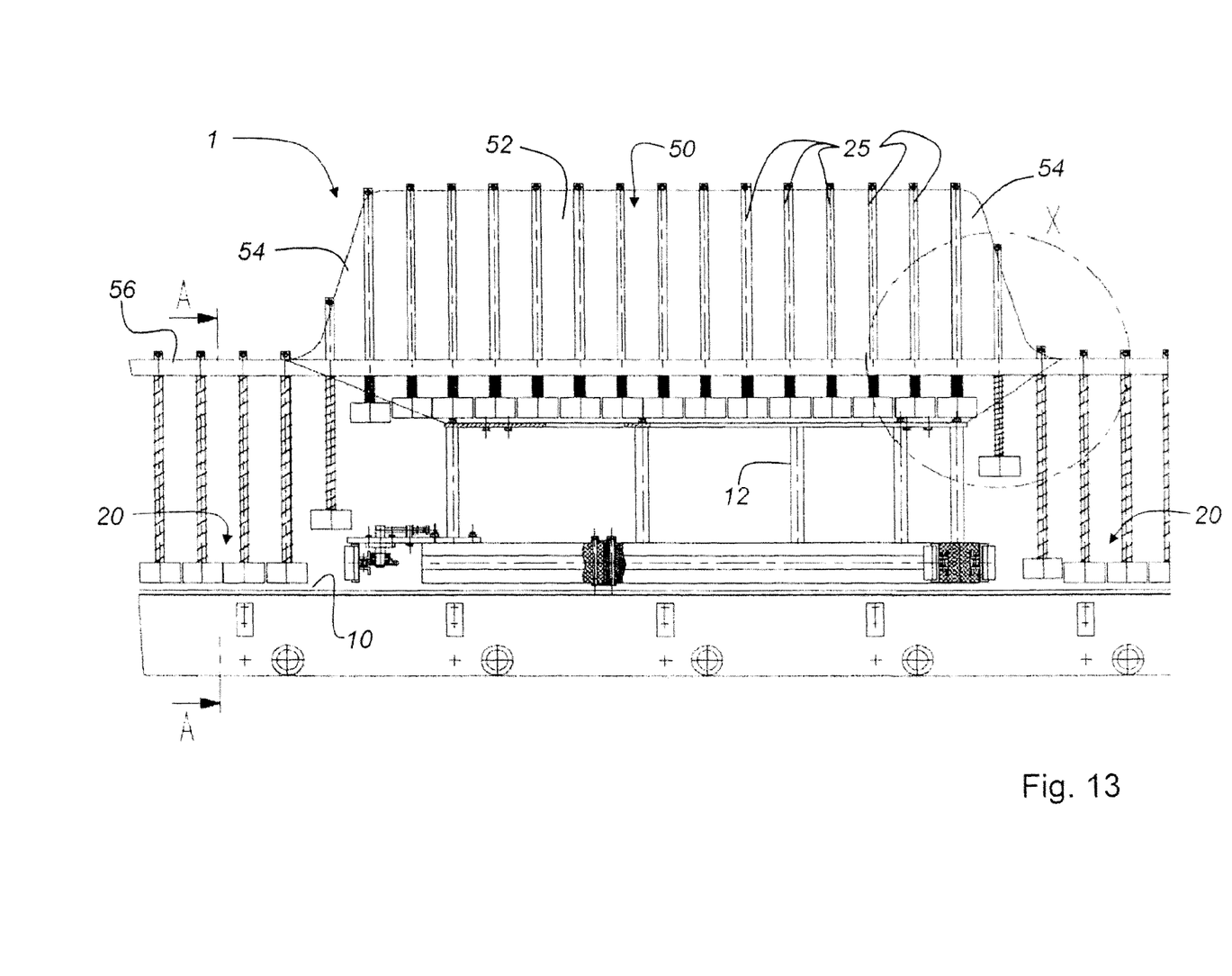
FIG. 13 also shows a side-face view of another embodiment of the apparatus for buffering objects; only in this case, a rail may be lowered from above onto the surface defined by first and second conveyor.

FIG. 13 shows another embodiment of apparatus 1 for buffering objects. In this embodiment, a controller 50 is provided above transfer device 12 which also consists of a rectangular portion 52 having a curved element 54 on both ends. Here, rail 20 is let down from above onto the surface 10 defined by first conveyor 2 and second conveyor 4 respectively elevated by the surface 10 defined by first conveyor 2 and second conveyor 4. Dependent on the state of transfer device 12 rail 20 is elevated by the surface 10 defined by first conveyor 2 and second conveyor 4. To that end, over the whole length of apparatus 1 for buffering objects, a carrier 56 for the different segments 25 of the rail 20 is provided. Dependent on motion of transfer device 12, controller 50 cooperates with different segments 25, elevating them accordingly from the surface 10 defined by first conveyor 2 respectively second conveyor 4.

Figure 14:
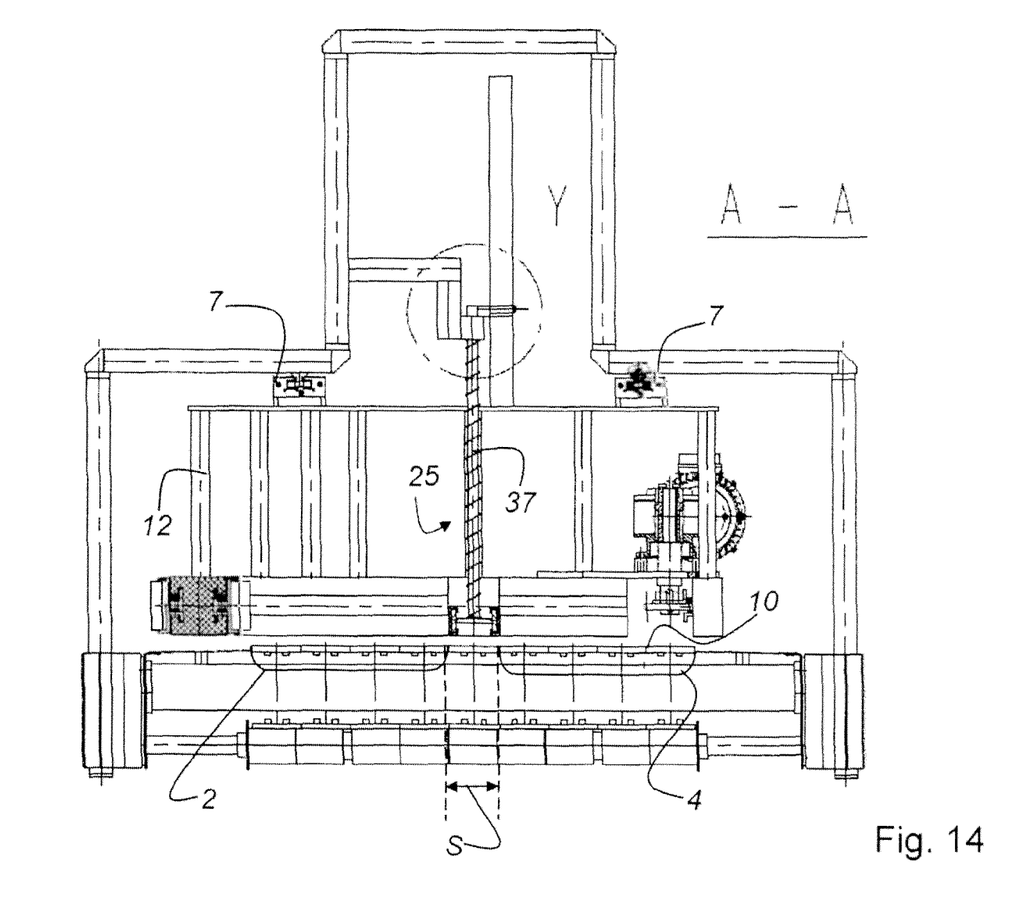
FIG. 14 is a front view of the embodiment shown in FIG. 13 along the line A-A shown in FIG. 13.

FIG. 14 is a view along the intersection line A-A represented in FIG. 13. It is not only in this embodiment but in all embodiments described in the present description, that first conveyor 2 and second conveyor 4 are composed of several single belt-shaped segments. In the embodiment represented in FIG. 14, first conveyor 2 and second conveyor 4 are spaced apart by a belt-shaped segment 25 of width S. The advantage of this embodiment is that there is no interference of ancillary components on surface 10 defined by first conveyor 2 and second conveyor 4. Between first conveyor 2 and second conveyor 4, a required rail 20 may be lowered from above onto the surface defined by first conveyor 2 and second conveyor 4. As already repeatedly mentioned, rail 20 is composed, in this case too, of individual segments 25. Each of the individual segments 25 is pretensioned by means of a spring 37 which thus lowers segment 25 onto surface 10 defined by first conveyor 2 and second conveyor 4 which allows a spatial separation between first conveyor 2 and second conveyor 4.

Figure 15:
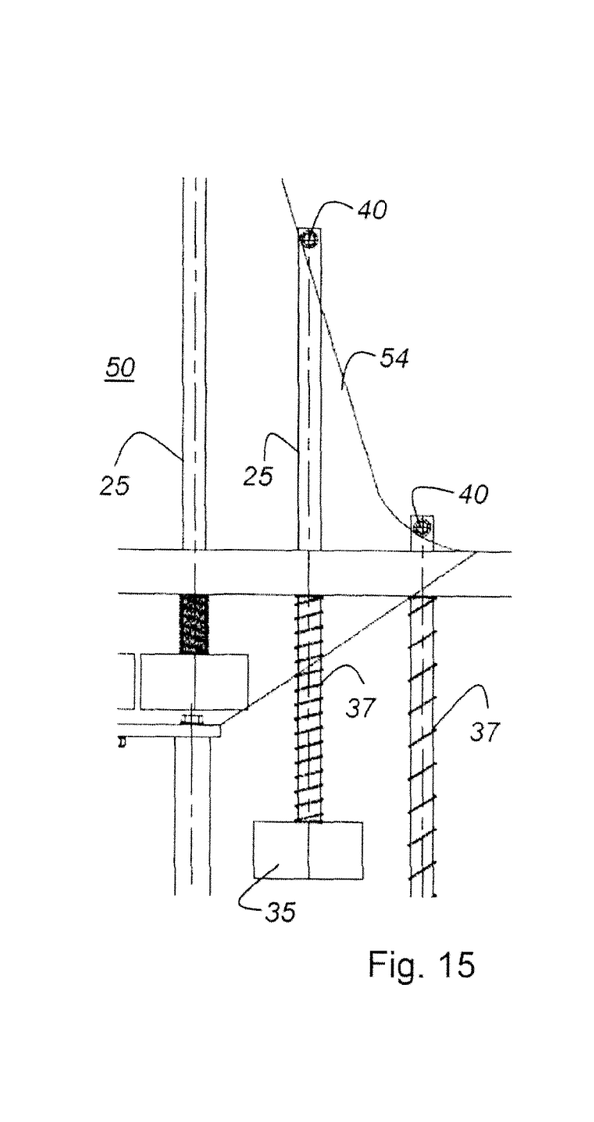
FIG. 15 is a detail view of the area referred to as X in FIG. 13.

FIG. 15 is an enlarged detail representation of the circle referred to as X in FIG. 13. In the end portion 35 of segment 25 there is provided a rotatable element 40 each. Rotatable element 40 cooperates with curved element 54 of controller 50 which lifts off different segments 25 from the surface and moves them to the constant level of cuboid-shaped portion 52 of controller 50. In rectangular portion 52 of controller 50, different segments 25 are maintained on a constant level (cf. FIG. 13).

Figure 16:
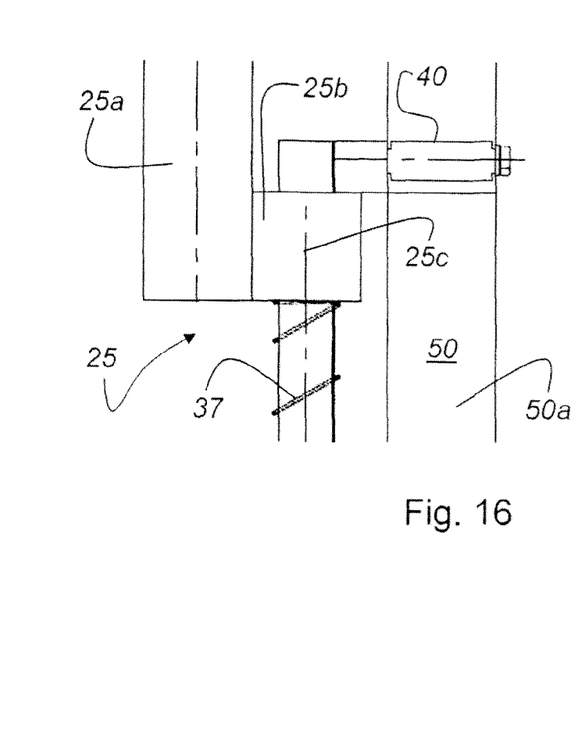
FIG. 16 is a detail view of the area referred to as Y in FIG. 14.

FIG. 16 is an enlarged representation of the circle referred to as Y in FIG. 14. The individual segment 25 of rail 20 is mounted on a carrier 25a which extends over the whole length of the area in which first conveyor 2 and second conveyor 4 extend parallel to each other. At the end portion 25b of segment 25, too, a rotatable element 40 is provided, in an angle of 90° with regard to vertical center line 25c of segment 25. Here, rotatable element 40 cooperates with controller 50 and rotatable element runs off, depending on the motion of the transfer device 12, on the surface 50a defined by controller 50. Segment 25 is thus correspondingly lifted off or lowered.

The disclosure has been described with regard to preferred embodiments. Of course, for a person skilled in the art amendments and variations are possible in the extent of protection of the following claims.

We claim:

1. Apparatus for buffering objects, comprising at least one first conveyor and at least one second conveyor which are parallel to each other but driven in opposite directions, objects entering the apparatus via the first conveyor and leaving the apparatus via the second conveyor, that along a linear guide a transfer device is displaceable parallel to first and second conveyor to transfer objects from the first conveyor to the second conveyor, and a controller is provided which extends or retracts a rail extending on at least one side of the first or the second conveyor, dependent on the position of the transfer device, wherein the controller is at least one curved element which is displaceable together with the transfer device along the linear guide, thus causing a change of position of the rail in accordance with the position of the transfer device.

2. Apparatus for buffering objects, comprising at least one first conveyor and at least one second conveyor which are parallel to each other but driven in opposite directions, objects entering the apparatus via the first conveyor and leaving the apparatus via the second conveyor, that along a linear guide a transfer device is displaceable parallel to first and second conveyor to transfer objects from the first conveyor to the second conveyor, and a controller is provided which extends or retracts a rail extending on at least one side of the first or the second conveyor, dependent on the position of the transfer device, wherein the controller is an electronic controller determining a travel path of the transfer device along the linear guide and thus controlling position of the rail in one of a motor-driven or pneumatic way wherein the rail is provided between the first and second conveyor; and wherein the rail is composed of plurality of individual segments.

3. Apparatus as claimed in claim 2, wherein the controller controls a telescopic array in a way that according to the distance between diverter element and an area of the apparatus from which first and second conveyor extend parallel to each other, a rail may be extended and respectively retracted.

4. Apparatus for buffering objects, comprising at least one first conveyor and at least one second conveyor which are parallel to each other but driven in opposite directions, objects entering the apparatus via the first conveyor and leaving the apparatus via the second conveyor, that along a linear guide a transfer device is displaceable parallel to first and second conveyor to transfer objects from the first conveyor to the second conveyor, and a controller is provided which extends or retracts a rail extending on at least one side of the first or the second conveyor, dependent on the position of the transfer device, wherein the rail is composed of a plurality of individually movable segments.

5. Apparatus as claimed in claim 1 or 4, wherein the rail is provided at one exterior of the first and second conveyor.

6. Apparatus as claimed in claim 5, wherein the rail is provided between the first and second conveyor.

7. Apparatus as claimed in claim 1, 2 or 4, wherein the first conveyor and the second conveyor are spaced apart by the width of a diverter element of the transfer device.

8. Apparatus as claimed in claim 5, wherein the rail is provided on each inner surface of first and second conveyor.

9. Apparatus as claimed in claim 1, wherein the individual segments of the rail have a substantially cuboid-shaped end portion one exterior surface of which is shaped in a way that the single elements form a substantially continuous surface with each other.

10. Apparatus as claimed in claim 9, wherein in its extended state, the rail rises above a surface defined by first and second conveyor.

11. Apparatus as claimed in claim 10, wherein in retracted state of the rail, the exterior surface of the different substantially cuboid-shaped end portions of the individual segments flushes with the surface defined by first and second conveyor.

12. Apparatus as claimed in claim 9, wherein in its extended state, the rail is lowered onto the surface defined by first and second conveyor.

13. Apparatus as claimed in claim 1, 2 or 4, wherein the rail is pretensioned by a flexible element which ensures transition of the rail respectively the different segments of the rail into its extended state.

14. Apparatus as claimed in claim 13, wherein the flexible element is a spring.

15. Apparatus as claimed in claim 13, wherein at least one curved element is assigned to the transfer device which ensures transition of the rail from extended into retracted state.

16. Apparatus as claimed in claim 15, wherein the curved element consists of a rectangular portion having a determined height, that a curve is shaped on both ends of the rectangular portion, the curve cooperating with a rotatable element of the rail respective a segment of the rail which is provided opposite to the end portion of the rail.

17. Apparatus as claimed in claim 1, 2 or 4, wherein the transfer device comprises a bow-shaped guide that extends from one exterior of first conveyor to one exterior of second conveyor.

18. Apparatus as claimed in claim 17, wherein the bow-shaped guide is a drivable endless conveyor belt.

19. Apparatus as claimed in claim 1, 2 or 4, wherein the objects to be buffered are in the form of a liquid tank.

20. Method for buffering objects, wherein at least one first conveyor and at least one second conveyor are provided parallel to each other but driven in opposite directions, wherein objects enter the apparatus via the first conveyor and leave the apparatus via the second conveyor, wherein a transfer device is displaced along a linear guide and parallel to the first and second conveyors, thereby transferring objects from the first conveyor to the second conveyor, wherein an electronic controller extends or retracts a rail composed of a plurality of individual segments, the rail extending on at least one side of the first or the second conveyor and provided between the first and second conveyor, dependent on the position of the transfer device, wherein the controller determines a travel path of the transfer device along the linear guide and thus controls position of the rail in one of a motor-driven or pneumatic way.

* * * * *